(12) United States Patent
Nakaho

(10) Patent No.: US 7,048,392 B2
(45) Date of Patent: May 23, 2006

(54) REFLECTING MIRROR

(75) Inventor: Junichi Nakaho, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 0 days.

(21) Appl. No.: 10/663,728

(22) Filed: Sep. 17, 2003

(65) Prior Publication Data
US 2004/0075920 A1    Apr. 22, 2004

(30) Foreign Application Priority Data
Sep. 20, 2002  (JP)  .............................. 2002-275093

(51) Int. Cl.
*G02B 17/00* (2006.01)
*G02B 5/08* (2006.01)

(52) U.S. Cl. ..................................... 359/603

(58) Field of Classification Search ........ 359/601–604, 359/838, 883, 884
See application file for complete search history.

(56) References Cited

U.S. PATENT DOCUMENTS

| | | | | |
|---|---|---|---|---|
| 4,465,339 A | * | 8/1984 | Baucke et al. | 359/274 |
| 4,889,414 A | * | 12/1989 | Rauh et al. | 359/273 |
| 4,973,141 A | | 11/1990 | Baucke et al. | |
| 5,124,080 A | * | 6/1992 | Shabrang et al. | 252/583 |
| 5,469,296 A | * | 11/1995 | Ohno et al. | 359/603 |
| 6,074,066 A | | 6/2000 | Macher et al. | |
| 6,234,636 B1 | * | 5/2001 | Macher et al. | 359/601 |

FOREIGN PATENT DOCUMENTS

| | | |
|---|---|---|
| JP | 61-239230 | 10/1986 |
| JP | 2001-330864 | 11/2001 |
| WO | WO 93/21557 | 10/1993 |

OTHER PUBLICATIONS

European Search Report Dated Dec. 5, 2003.

* cited by examiner

*Primary Examiner*—Mark A. Robinson
*Assistant Examiner*—Alessandro Amari
(74) *Attorney, Agent, or Firm*—Nixon Peabody LLP

(57) ABSTRACT

In a reflecting mirror, a hydrogen storing metal or a hydrogen storing alloy is used in an electrically conductive reflecting film. When a predetermined voltage is applied from an electrically conductive reflecting film side to a transparent electrode, hydrogen stored at the electrically conductive reflecting film is released and becomes hydrogen ions, and the hydrogen ions move toward the transparent electrode. When the hydrogen ions reach a reduction coloring film between the transparent electrode and the electrically conductive reflecting film, the hydrogen ions bond with an oxide of tungsten which forms the reduction coloring film, and the reduction coloring film is thereby colored. In accordance with this structure, it is possible to do away with an oxidation coloring film.

11 Claims, 2 Drawing Sheets ered by, for example, a bluish color. Moreover,
REFLECTING MIRROR

CROSS-REFERENCE TO RELATED APPLICATION

This application claims priority under 35USC 119 from Japanese Patent Application No. 2002-275093, the disclosure of which is incorporated by reference herein.

BACKGROUND OF THE INVENTION

1. Field of the Invention

The present invention relates to a reflecting mirror which reflects light, and in particular, to a reflecting mirror which is suitable as a door mirror, an interior mirror or the like mounted to a vehicle.

2. Description of the Related Art

Reflecting mirrors, which are called door mirrors (and sometimes called outer view mirrors) and which are for confirming the regions at the rear left and the rear right of a vehicle, are provided at a vehicle.

Confirmation of the regions at the rear of the vehicle in such a reflecting mirror is carried out by confirming the reflected image formed by the light reflected by the reflecting mirror. At night or the like, for example, due to the light of the headlights of a vehicle traveling behind being reflected in the reflecting mirror, it can be confirmed that there is a vehicle traveling behind.

However, at night or the like, the light of headlights are sufficiently bright with respect to the surrounding brightness, and the light reflected at the reflecting mirror is glaring. Thus, as disclosed in Japanese Patent Application Laid-Open (JP-A) No. 2001-330864, reflecting mirrors, in which an electrochromic covering film is provided between a glass substrate and a reflecting film, have sometimes been used as door mirrors and the like of vehicles in recent years.

The basics of the structure of a reflecting mirror 50 at which an electrochromic covering film 52 is provided are shown in cross-sectional view in FIG. 2.

As shown in FIG. 2, the reflecting mirror 50 is provided with a substantially transparent glass substrate 54. An electrically conductive reflecting film 56, which is shaped as a thin film and contains aluminum or the like, is formed on the rear surface of the glass substrate 54.

The electrochromic covering film 52 is disposed between the glass substrate 54 and the electrically conductive reflecting film 56. The electrochromic covering film 52 is structured by, for example and in order from the glass substrate 54 side, a transparent electrode 58 which is transparent and contains ITO (Indium Tin Oxide), an oxidation coloring film 60 formed of iridium oxide or the like, an ion conducting film 62 which contains tantalum oxide or the like and through which the passage of hydrogen ions is possible, and a reduction coloring film 64 formed of tungsten oxide or the like.

When a predetermined voltage is applied to the reflecting mirror 50 having this structure from the transparent electrode 58 side, hydrogen ions are released from the oxidation coloring film 60. The released hydrogen ions pass through the ion conducting film 62, and move to the reduction coloring film 64. Due to the hydrogen ions which have moved thereto, a reversible chemical reaction occurs at the reduction coloring film 64. The reduction coloring film 64 is thereby colored to, for example, a bluish color. Moreover, the oxidation coloring film 60 is colored, albeit slightly, due to the hydrogen being released. In this way, due to the reduction coloring film 64 and the oxidation coloring film 60 being colored, the transmittance of light at the electrochromic covering film 52 is reduced. Therefore, even if the light of headlights is incident on the reflecting mirror 50 as described above, the light amount of the reflected light can be reduced, and the ability to prevent glare can be improved.

Moreover, in this state in which the reduction coloring film 64 and the oxidation coloring film 60 are colored, when the aforementioned application of voltage is cancelled, or reverse voltage is applied, hydrogen ions are released from the reduction coloring film 64 and return toward the oxidation coloring film 60. Due to this reaction, the coloration of the reduction coloring film 64 and the oxidation coloring film 60 is cancelled, and the films 64, 60 return to their original states.

In the reflecting mirror 50 having the electrochromic covering film 52 as described above, five layers of thin films, which are the electrically conductive reflecting film 56, the transparent electrode 58, the oxidation coloring film 60, the ion conducting film 62 and the reduction coloring film 64 are needed. Accordingly, five film forming processes are required, and a problem arises in that the manufacturing costs are high.

Moreover, transmittance of light is greatly affected by the film thicknesses and the film qualities of the respective thin films. Accordingly, if the film thicknesses and the film qualities of all of the aforementioned five thin films are not managed, the product quality of the reflecting mirror 50 cannot be stabilized. In addition, if the oxidation coloring film 60 contains iridium oxide, it is not completely transparent even in the state before it becomes colored. Thus, the transmittance of light at usual times is low, and it is difficult to make large the difference between the transmittances of light before and after coloring.

SUMMARY OF THE INVENTION

In view of the aforementioned, an object of the present invention is to provide a reflecting mirror which is inexpensive, and in which the transmittance of light at usual times is high, and which has stable product quality.

A first aspect of the present invention is to provide a reflecting mirror comprising: a substrate through which light passes; an electrode film which is electrically conductive, which is substantially transparent, and which is formed at a rear surface side of the substrate; a reduction coloring film formed at a surface of the electrode film at a side opposite a side where the substrate is disposed, the reduction coloring film coloring due to a reversible chemical reaction with hydrogen ions; and an electrically conductive reflecting film which is formed at a surface of the reduction coloring film at a side opposite a side where the electrode film is disposed, and which reflects light at least at a substrate side surface, and which contains a hydrogen storing metal which stores hydrogen in an adsorbed state, and which, due to application of voltage, releases hydrogen and moves the hydrogen as hydrogen ions toward the reduction coloring film, and which, due to one of canceling of the application of said voltage and applying of a voltage which is reverse of said voltage, attracts the hydrogen ions that have moved toward the reduction coloring film and adsorbs and stores the hydrogen ions as hydrogen.

In a reflecting mirror having the above-described structure, a reflecting film having a particular reflectance is formed at the rear surface of the substrate. The light, which has passed through the substrate from the obverse side of the substrate and reaches the rear surface side of the substrate, is reflected by the reflecting film at a particular reflectance, and again passes through the substrate and exits to the exterior from the obverse side of the substrate.

In the reflecting mirror of the present invention, an electrode film, a reduction coloring film, and an electrically conductive reflecting film are formed at the rear surface side of the substrate. When voltage is applied from the electrically conductive reflecting film toward the electrode film, the hydrogen, which is stored at the electrically conductive reflecting film in an adsorbed state, is released from the electrically conductive reflecting film. The released hydrogen becomes hydrogen ions and moves toward the reduction coloring film.

At the reduction coloring film, a reversible chemical reaction is caused due to the hydrogen ions which have moved thereto. In this way, the reduction coloring film is colored to a predetermined color (e.g., a bluish color). Accordingly, in this state, the transmittance of light at the reduction coloring film decreases. The light heading from the substrate toward the electrically conductive reflecting film, and the light reflected at the electrically conductive reflecting film, are decreased.

Thus, for example, if the present reflecting mirror is used as a rearview mirror such as a door mirror or an interior mirror for confirming the region at the rear of the vehicle, in a case in which the light from the headlights of a vehicle traveling behind at night or the like is incident on the present reflecting mirror, as described above, if voltage is applied to the electrically conductive reflecting film such that the reduction coloring film is colored, the reflected light can be decreased, and the ability to prevent glare can be improved.

Here, in the present reflecting mirror, a hydrogen storing metal (sometimes called a hydrogen adsorbing metal) is used as the electrically conductive reflecting film. By applying voltage to the electrically conductive reflecting film as described above, hydrogen is released from the electrically conductive reflecting film and becomes released hydrogen ions, and the hydrogen ions move toward the reduction coloring film. Thus, it becomes unnecessary for a reflecting mirror to have an oxidation coloring film formed of iridium oxide or the like, and a process for forming a film can be omitted in the manufacturing process of the aforementioned reflecting mirror having the ability to prevent glare.

In this way, as compared with a structure having many layers of thin films, dispersion in the film thicknesses and film qualities can be reduced, and the product quality can be stabilized. Further, because an oxidation coloring film formed of iridium oxide or the like is not used, there is no need to consider the transmittance of light at an oxidation coloring film as there has been heretofore. The transmittance of light is improved in the state in which the coloring at the reduction coloring film is cancelled.

A second aspect of the present invention is to provide a reflecting mirror of the first aspect, in which an ion conducting film, which contains a dielectric and through which hydrogen ions can pass, is provided between the electrically conductive reflecting film and the reduction coloring film.

In the reflecting mirror having the above-described structure, an ion conducting film, through which hydrogen ions can pass, is provided between the electrically conductive reflecting film and the reduction coloring film. The hydrogen ions, which move from one of the electrically conductive reflecting film and the reduction coloring film toward the other, pass through the ion conducting film. Moreover, because this ion conducting film is a dielectric, the insulating ability thereof is good. In this way, relatively good insulation is maintained between the electrically conductive reflecting film and the reduction coloring film.

DETAILED DESCRIPTION OF THE INVENTION

Figure 1:
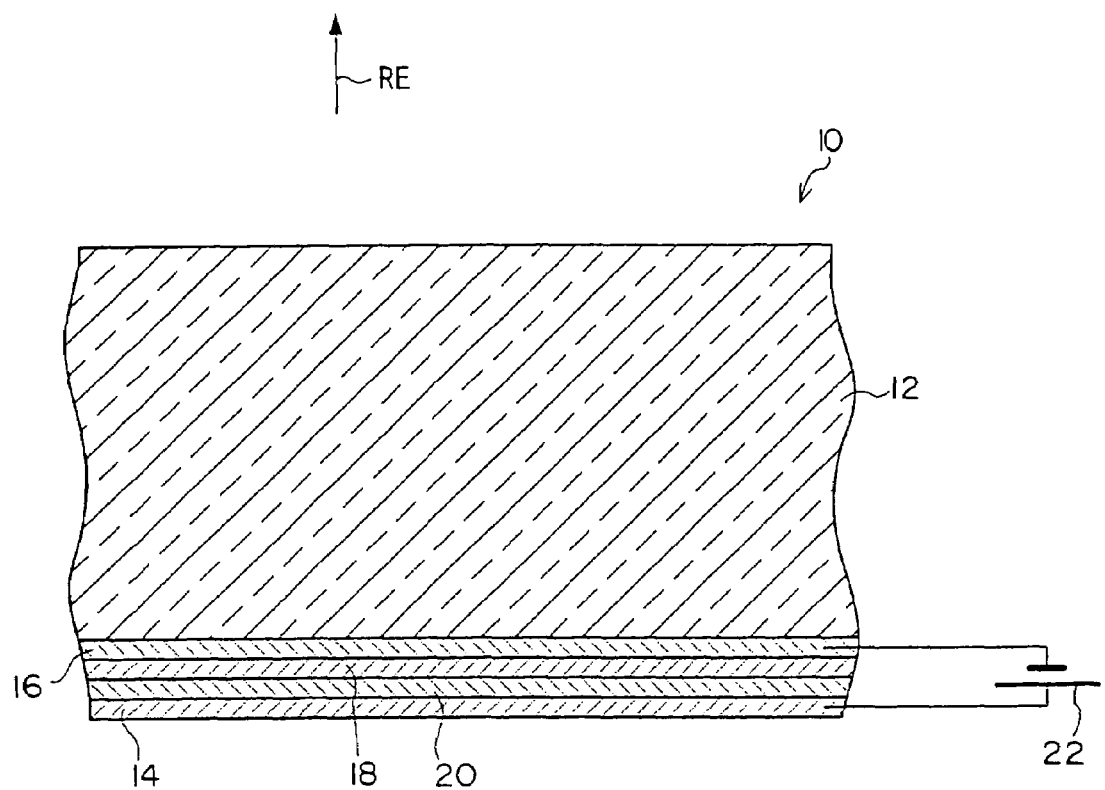
FIG. 1 is an enlarged cross-sectional view of a reflecting mirror of an embodiment of the present invention.
Figure 2:
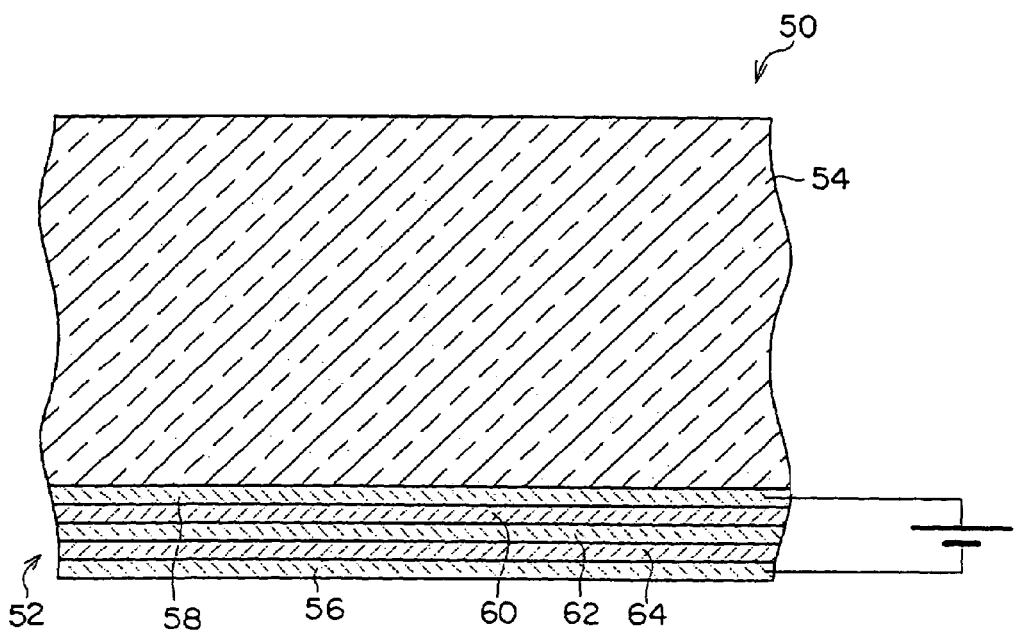
FIG. 2 is an enlarged cross-sectional view of a conventional reflecting mirror having an electrochromic covering film.

The structure of a reflecting mirror 10 of an embodiment is shown in a schematic enlarged cross-sectional view in FIG. 1.

As shown in FIG. 1, the reflecting mirror 10 has a glass substrate 12 serving as a substrate. An electrically conductive reflecting film 14 is provided at the rear surface of the glass substrate 12 (the surface at the side in the direction opposite the direction of arrow RE in FIG. 1).

Examples of material used for the electrically conductive reflecting film 14 include so-called "hydrogen storing metals" (such as palladium (Pd), rhodium (Rh), platinum (Pt) or the like, sometimes called "hydrogen adsorbing metals" or "hydrogen occluding metals") which can adsorb and hold hydrogen in the state of atoms, or alloys having functions equivalent to those of such hydrogen storing metals. Among these, for example, a metal is used which has a metal gloss at the surface and reflects light at a particular reflectance when formed in the shape of a smooth surface sheet. The electrically conductive reflecting film 14 is formed substantially in the shape of a thin film with such a metal. The surface thereof at least at the glass substrate 12 side has sufficient gloss and high reflectance of light. Accordingly, when the light incident from the obverse side of the glass substrate 12 passes through the glass substrate 12 and reaches the rear surface side of the glass substrate 12, this light is reflected by the electrically conductive reflecting film 14, again passes through the glass substrate 12, and heads toward the obverse side of the glass substrate 12.

A transparent electrode 16 serving as an electrode film is provided between the electrically conductive reflecting film 14 and the glass substrate 12. The transparent electrode 16 contains ITO (Indium Tin Oxide) in the shape of a thin film. The transparent electrode 16 is basically transparent, and light incident from either of the glass substrate 12 side or the electrically conductive reflecting film 14 side thereof can pass therethrough toward the other side.

A reduction coloring film 18 is provided between the transparent electrode 16 and the electrically conductive reflecting film 14. The reduction coloring film 18 contains an oxide of tungsten (as one example, $WO_3$) in the shape of a thin film.

Basically, the reduction coloring film 18 is substantially transparent. However, due to the reduction coloring film 18 engaging in a reversible chemical reaction together with hydrogen ions and the hydrogen ions bonding thereto, the reduction coloring film 18 is colored to a bluish color. Further, in this colored state, when the bonding of the hydrogen ions is cancelled, the coloring is cancelled and the reduction coloring film 18 again returns to substantially transparent.

An ion conducting film 20 is disposed between the reduction coloring film 18 and the electrically conductive reflecting film 14. The ion conducting film 20 contains a dielectric such as tantalum oxide ($Ta_2O_5$), silicon oxide ($SiO_2$), magnesium fluoride ($MgF_2$) or the like substantially in the shape of a thin film. The passage of hydrogen ions (H$^+$) from the electrically conductive reflecting film 14 side to the reduction coloring film 18 side, and the passage of hydrogen ions (H$^+$) from the reduction coloring film 18 side to the electrically conductive reflecting film 14 side, are possible, and basically, the ion conducting film 20 insulates between the electrically conductive reflecting film 14 and the transparent electrode 16.

In the reflecting mirror 10 having the above-described structure, each of the electrically conductive reflecting film 14 and the transparent electrode 16 is connected to a d.c. power source 22 via an unillustrated control means such as a switch, a light sensor, a CPU (ECU), or the like.

<Operation and Effects of Reflecting Mirror 10>

Next, the operation and effects of the present reflecting mirror 10 will be described.

In the present reflecting mirror 10, the light which passes through the glass substrate 12 is incident on the electrically conductive reflecting film 14, and is reflected at an angle corresponding to the angle of incidence at this time and at the reflectance of the electrically conductive reflecting film 14, and again passes through the glass substrate 12 and exits to the exterior from the obverse side of the glass substrate 12. Accordingly, when the present reflecting mirror 10 is applied to a door mirror of a vehicle, the state substantially at the rear of the vehicle can be confirmed by viewing the reflected image formed by this reflected light.

Moreover, in the present reflecting mirror 10, when an unillustrated switch is operated or a light sensor senses light of a predetermined intensity or greater, the control means applies a predetermined voltage from the electrically conductive reflecting film 14 to the transparent electrode 16. In this way, the hydrogen stored in the electrically conductive reflecting film 14 is released and becomes hydrogen ions, and the hydrogen ions move toward the transparent electrode 16 side. The hydrogen ions, which move toward the transparent electrode 16 side, pass through the ion conducting film 20 and reach the reduction coloring film 18. For example, if the reduction coloring film 18 contains an oxide of tungsten (WO$_3$), the hydrogen ions bond with the oxide of tungsten such that H$_x$WO$_3$ is formed, and the reduction coloring film 18, which heretofore had been substantially transparent, is colored to a substantially bluish color.

In this way, the transmittance of light at the reduction coloring film 18 is reduced. Accordingly, in a case in which strong light is incident on the reflecting mirror 10, by applying a predetermined voltage between the electrically conductive reflecting film 14 and the transparent electrode 16 so as to lower the transmittance of light of the reduction coloring film 18, the brightness of the reflected light is reduced. Accordingly, if this type of reflecting mirror is used as a door mirror or an interior mirror or the like for confirming the region at the rear of a vehicle, the brightness of the reflected light at the time when the reflecting mirror 10 reflects light from the headlights, etc. of a vehicle traveling behind at night or the like can be reduced, and the ability to prevent glare can be improved.

On the other hand, in the above-described colored state of the reduction coloring film 18, when the unillustrated switch is operated or the light sensor no longer senses light of a predetermined intensity or more, the predetermined voltage from the electrically conductive reflecting film 14 to the transparent electrode 16 is stopped by the control means, or a predetermined voltage is applied from the transparent electrode 16 to the electrically conductive reflecting film 14 by the control means.

In this way, the bonding of the reduction coloring film 18 and the hydrogen ions is cancelled. The hydrogen ions, whose bonding together with the reduction coloring film 18 has been cancelled, pass through the ion conducting film 20, and in the state of hydrogen atoms, are again adsorbed by and stored at the electrically conductive reflecting film 14. In this way, the reduction coloring film 18, whose bonding together with the hydrogen ions has been cancelled, again becomes substantially transparent, and the transmittance of light of the present reflecting mirror 10 returns to the state before the reduction coloring film 18 colored.

Here, in the present reflecting mirror 10, the electrically conductive reflecting film 14 contains a hydrogen storing alloy. As described above, by applying voltage to the electrically conductive reflecting film 14, hydrogen is released from the electrically conductive reflecting film 14 and becomes released hydrogen ions, and the hydrogen ions move to the reduction coloring film 18. Thus, it becomes unnecessary for a reflecting mirror to have an oxidation coloring film formed of iridium oxide or the like, and a film forming process can be omitted in the manufacturing process of the aforementioned reflecting mirror 10 having the ability to prevent glare.

In this way, a film forming process for forming an oxidation coloring film becomes unnecessary, the number of layers of thin films formed at the glass substrate 12 can be reduced. Thus, the dispersion in the film thicknesses and film qualities of the respective thin films can be reduced, and the product quality can be stabilized. Further, because an oxidation coloring film formed of iridium oxide or the like is not used, there is no need to consider the transmittance of light at the oxidation coloring film as there has been heretofore, and the transmittance of light in the state in which the coloring of the reduction coloring film 18 is cancelled is improved.

As described above, in the present invention, because there is no need for an oxidation coloring film, the cost can be reduced, the transmittance of light at usual times can be increased, and the product quality can be stabilized.

What is claimed is:

1. A reflecting element comprising a mirror assembly consisting essentially of:
    a substrate through which light passes;
    an electrode film which is electrically conductive, which is substantially transparent, and which is formed at a rear surface side of the substrate;
    a reduction coloring film formed at a surface of the electrode film at a side opposite a side where the substrate is disposed, the reduction coloring film coloring due to a reversible chemical reaction with hydrogen ions; and
    an electrically conductive reflecting film which is formed at a surface of the reduction coloring film at a side opposite a side where the electrode film is disposed, and which reflects light at least at a substrate side surface, and which contains a hydrogen storing metal which stores hydrogen in an adsorbed state, and which, due to application of voltage, releases hydrogen and moves the hydrogen as hydrogen ions toward the reduction coloring film, and which, due to one of canceling of the application of said voltage and applying of a voltage which is reverse of said voltage, attracts the hydrogen ions that have moved toward the reduction coloring film and adsorbs and stores the hydrogen ions as hydrogen,
    wherein said reflecting film is highly reflective of light regardless of whether said hydrogen storing metal releases or adsorbs said hydrogen ions.

2. The reflecting element of claim 1, wherein an ion conducting film, which contains a dielectric and through which hydrogen ions can pass, is provided between the electrically conductive reflecting film and the reduction coloring film.

3. The reflecting element of claim 2, wherein the dielectric comprises at least one selected from the group consisting of tantalum oxide ($Ta_2O_5$), silicon oxide ($SiO_2$), and magnesium fluoride ($MgF_2$).

4. The reflecting element of claim 1, wherein the hydrogen storing metal comprises at least one selected from the group consisting of palladium (Pd), rhodium (Rh), platinum (Pt), and alloys having functions equivalent to those of these hydrogen storing metals.

5. The reflecting element of claim 1, wherein the electrode film comprises ITO (Indium Tin Oxide).

6. The reflecting element of claim 1, wherein the reduction coloring film comprises an oxide of tungsten.

7. The reflecting element of claim 1, wherein the reduction coloring film is colored to a bluish color due to a reversible chemical reaction with the hydrogen ions.

8. The reflecting element of claim 1, further comprising a control means, wherein the electrically conductive reflecting film and the electrode film are connected to a power source via the control means.

9. The reflecting element of claim 1, further comprising a light sensor.

10. A rearview element for a vehicle comprising the reflecting mirror of claim 1.

11. A reflecting element comprising:
a substrate through which light passes;
an electrode film which is electrically conductive, which is substantially transparent, and which is farmed at a rear surface side of the substrate;
a reduction coloring film formed at a surface of the electrode film at a side opposite a side where the substrate is disposed, the reduction coloring film coloring due to a reversible chemical reaction with hydrogen ions; and
an electrically conductive reflecting film which is formed at a surface of the reduction coloring film at a side opposite a side where the electrode film is disposed, and which reflects light at least at a substrate side surface, and which contains a hydrogen staring metal which stores hydrogen in an adsorbed state, and which, due to application of voltage, releases hydrogen and moves the hydrogen as hydrogen ions toward the reduction coloring film, end which, due to one of canceling of the application of said voltage and applying of a voltage which is reverse of said voltage, attracts the hydrogen ions that have moved toward the reduction coloring film and adsorbs and stores the hydrogen ions as hydrogen,
wherein a reflectivity of said reflecting film remains constant regardless of whether said hydrogen storing metal releases or absorbs said hydrogen ions.

* * * * *